United States Patent
Feiten et al.

(10) Patent No.: US 6,463,368 B1
(45) Date of Patent: Oct. 8, 2002

(54) METHOD AND DEVICE FOR DETERMINING A PATH AROUND A DEFINED REFERENCE POSITION

(75) Inventors: Wendelin Feiten, Neubiberg; Jörg Illmann, Neu-Ulm; Werner Neubauer, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/762,743

(22) PCT Filed: Jul. 1, 1999

(86) PCT No.: PCT/DE99/01947

§ 371 (c)(1),
(2), (4) Date: Feb. 12, 2001

(87) PCT Pub. No.: WO00/10062

PCT Pub. Date: Feb. 24, 2000

(30) Foreign Application Priority Data

Aug. 10, 1998 (DE) .......................................... 198 36 101

(51) Int. Cl.⁷ ................................................. G06F 7/00
(52) U.S. Cl. .......................................... 701/23; 701/205
(58) Field of Search .......................... 701/1, 2, 23, 200, 701/205, 300

(56) References Cited

U.S. PATENT DOCUMENTS

| | | | | | |
|---|---|---|---|---|---|
| 4,962,453 A | * | 10/1990 | Pong et al. | .................... | 701/23 |
| 5,634,237 A | * | 6/1997 | Paranjpe | ...................... | 15/319 |
| 5,758,298 A | * | 5/1998 | Guldner | ....................... | 701/23 |

FOREIGN PATENT DOCUMENTS

| | | | | |
|---|---|---|---|---|
| DE | 2 251 271 | * | 5/1994 | |
| FR | 2 697 098 | * | 4/1994 | |

* cited by examiner

Primary Examiner—William A. Cuchlinski, Jr.
Assistant Examiner—Edward Pipala
(74) Attorney, Agent, or Firm—Schiff Hardin & Waite

(57) ABSTRACT

A path is determined in the following iterative way: An arcuate path around the reference position having a predetermined spacing is determined step-by-step. The existence of an obstacle along the arcuate path is checked. The arcuate path is lengthened as long as no obstacle is found. When an obstacle is found, the spacing is enlarged by a prescribable value and the method is continued in a new iteration with the enlarged spacing.

25 Claims, 6 Drawing Sheets

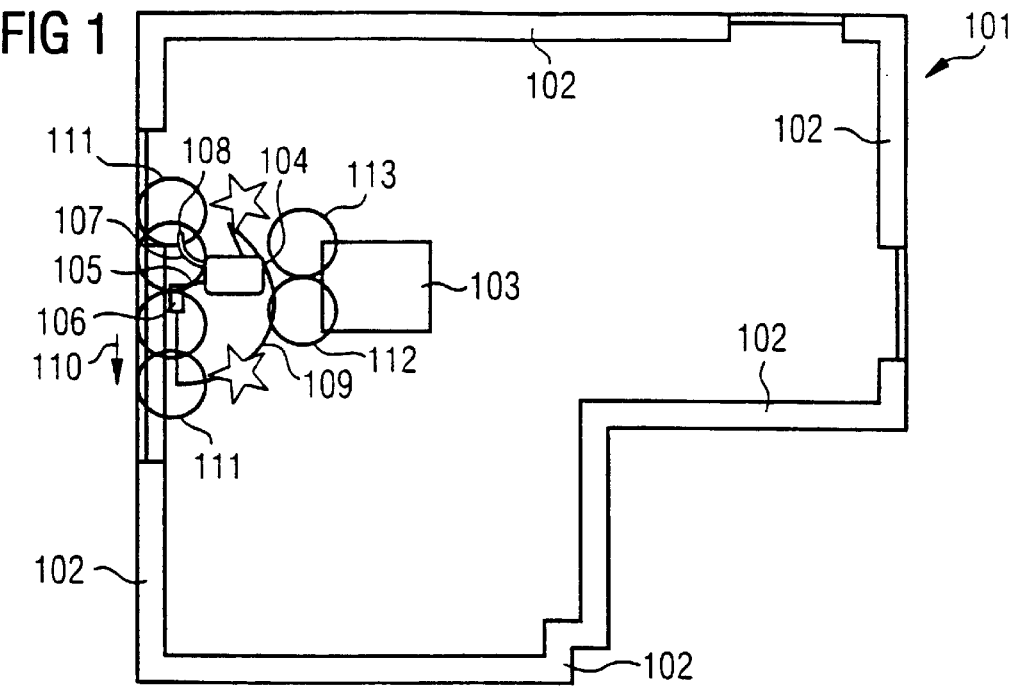
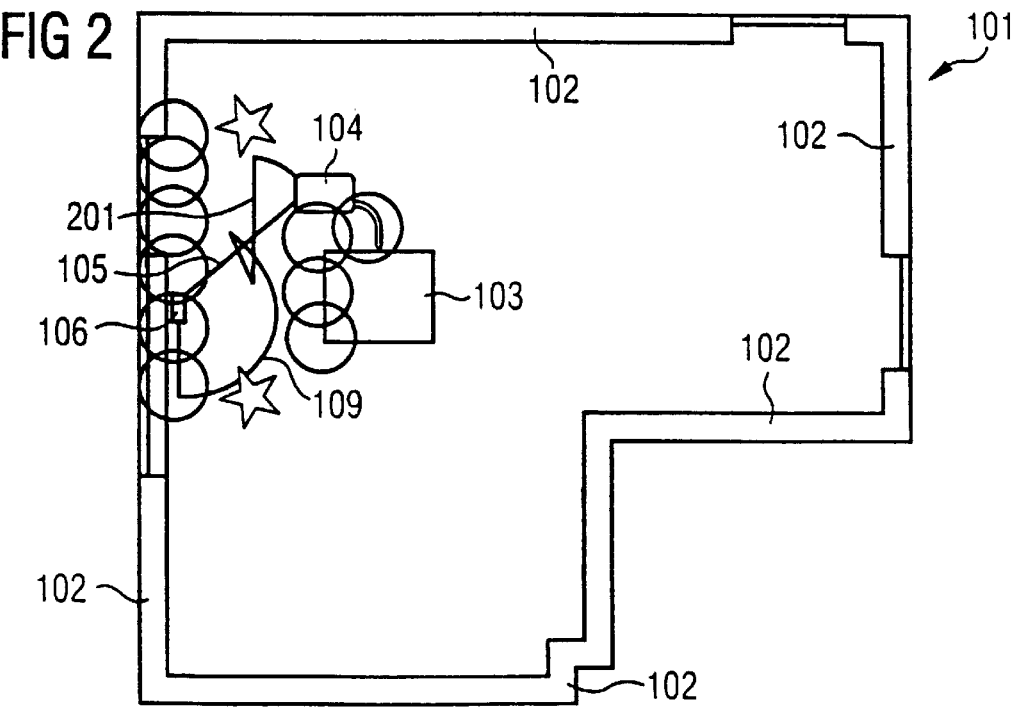

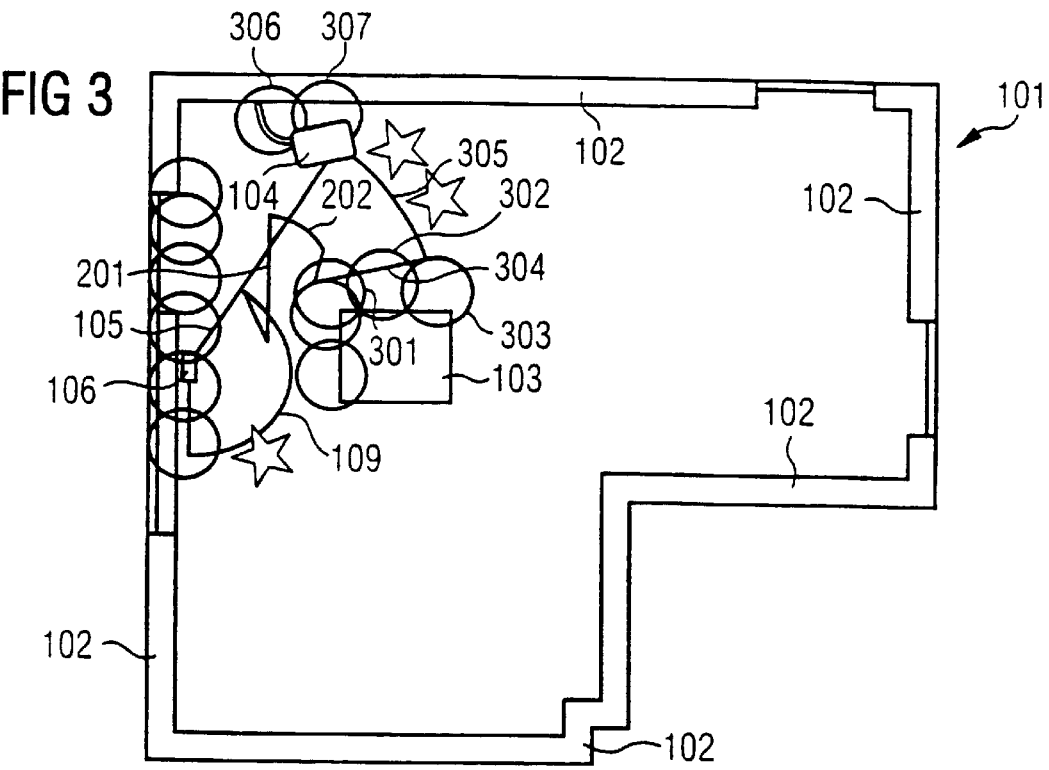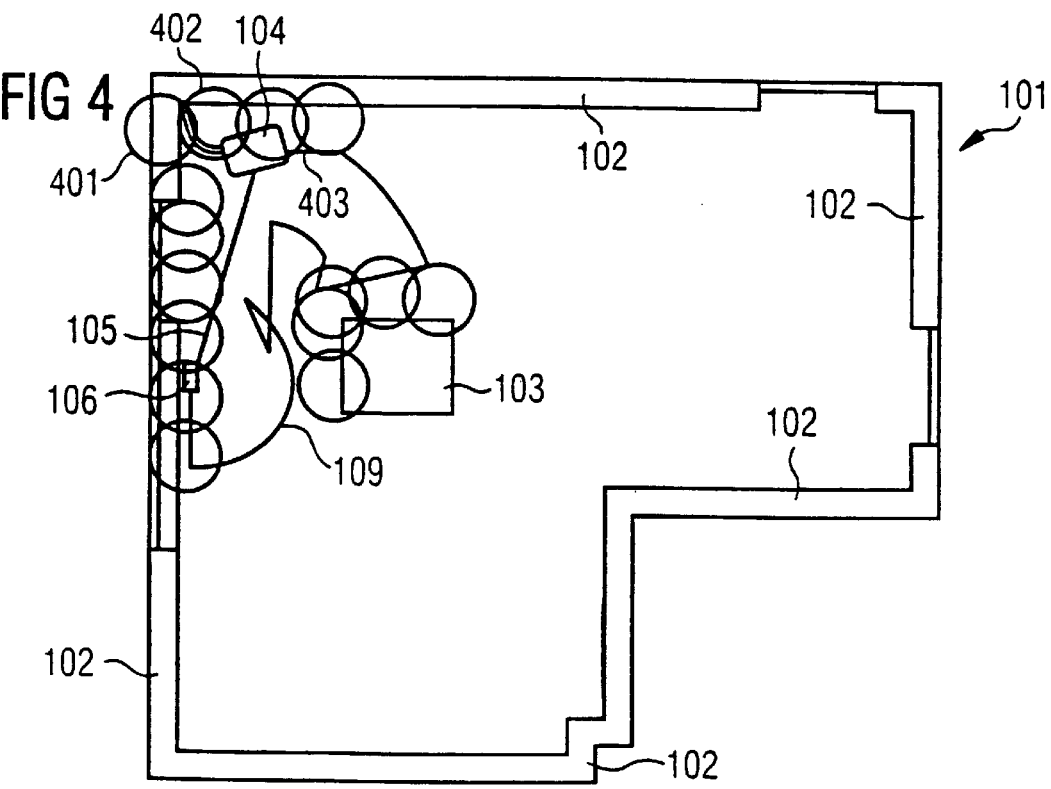

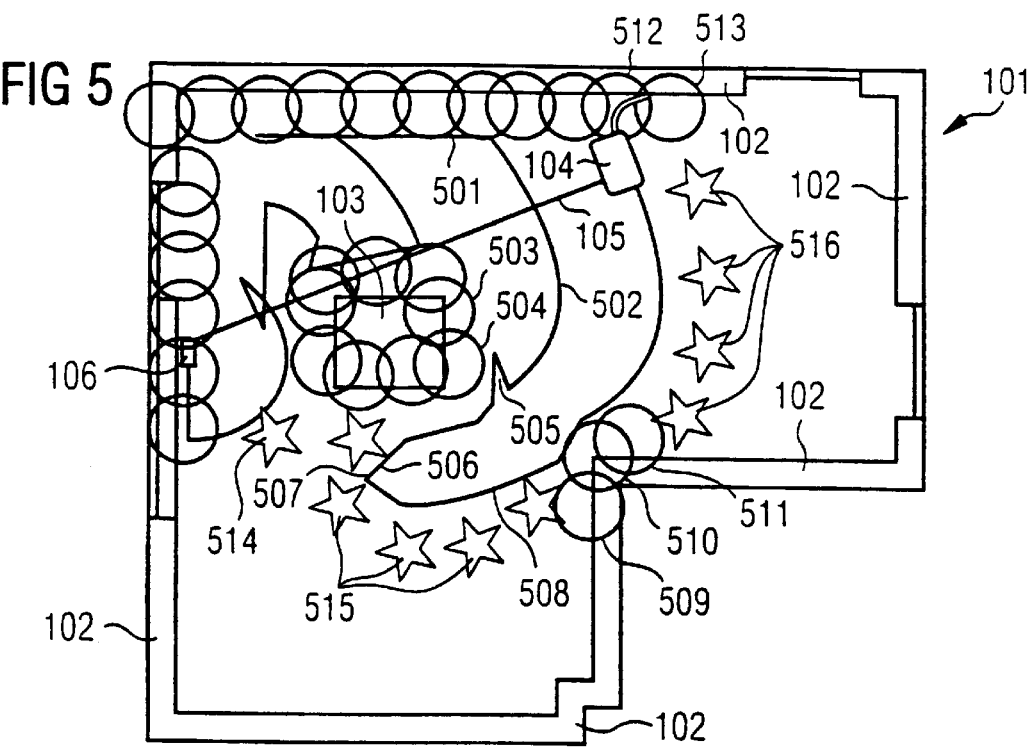
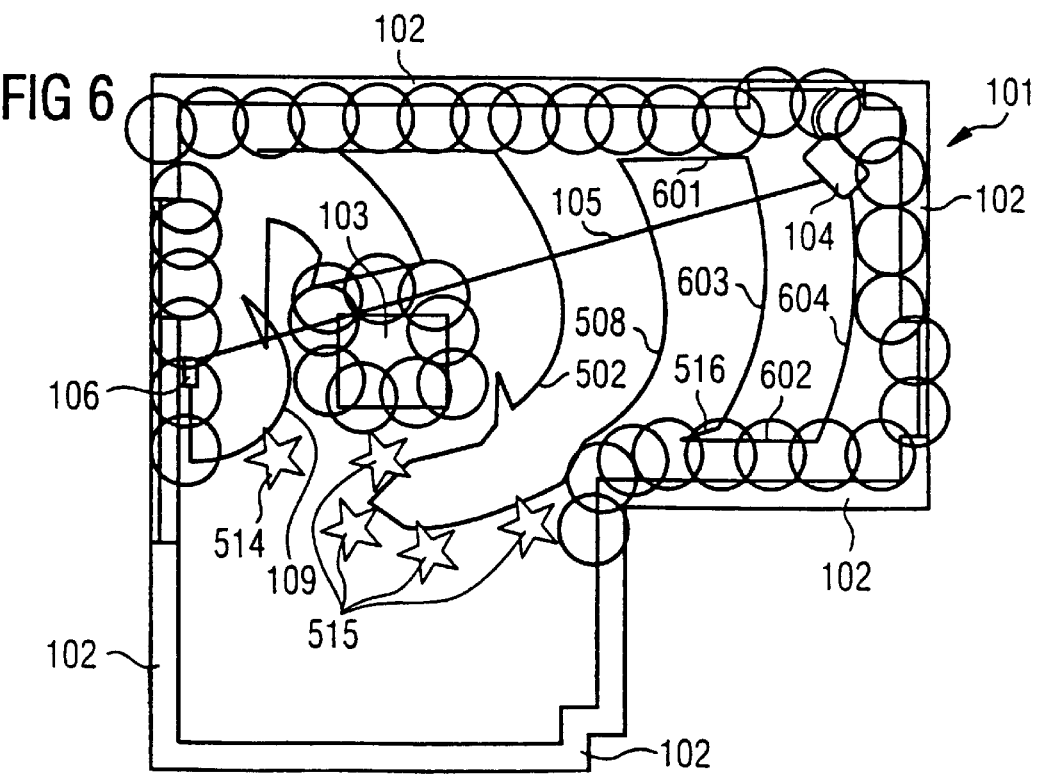

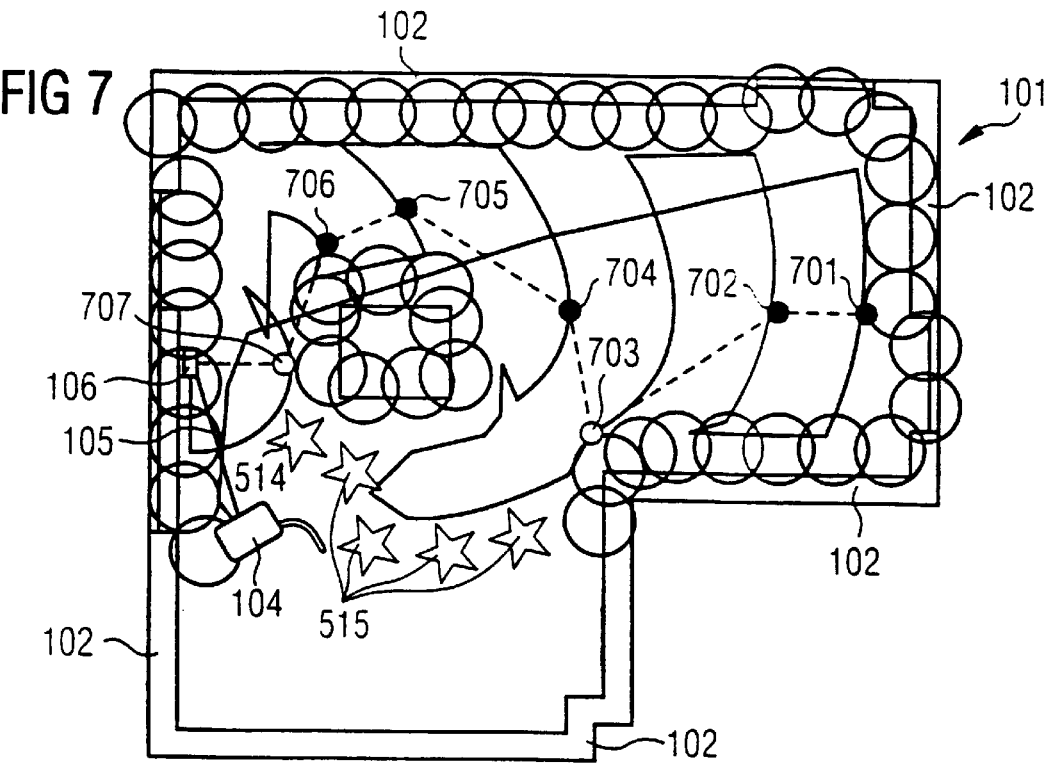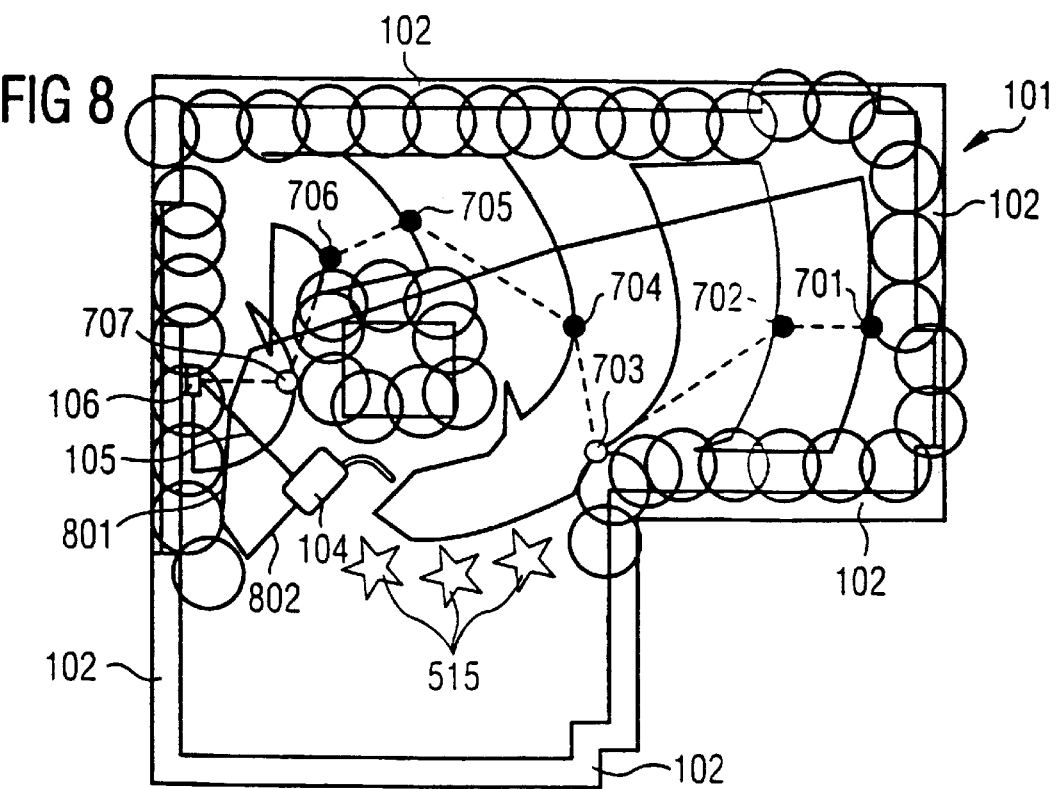

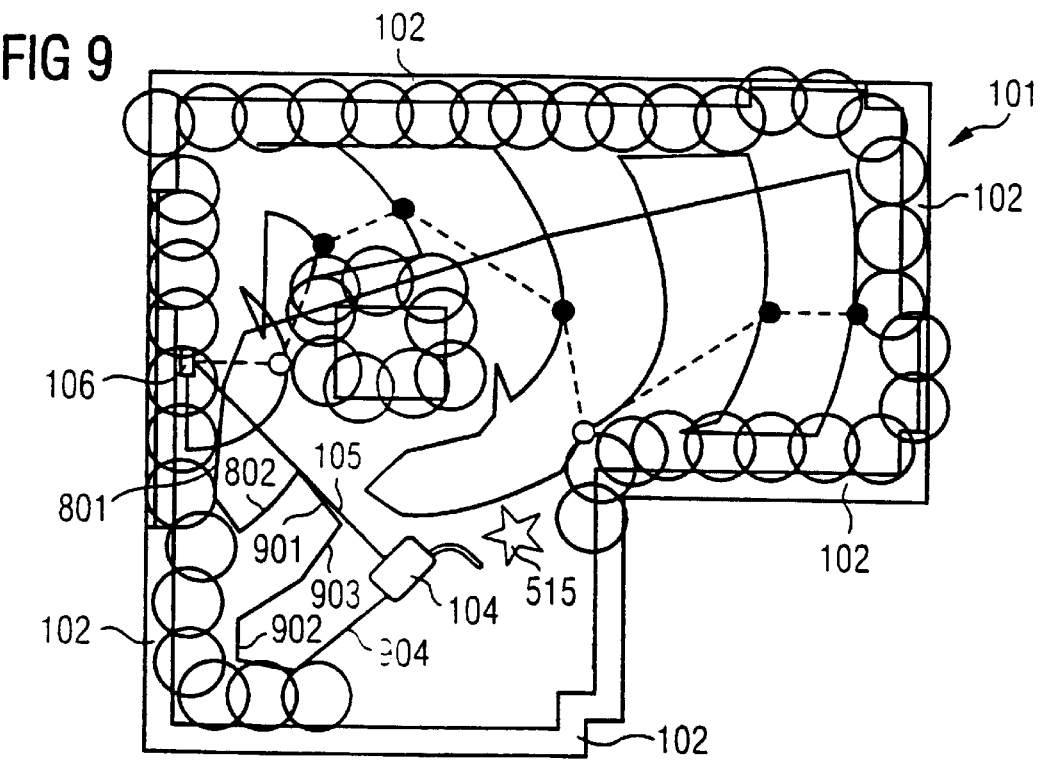
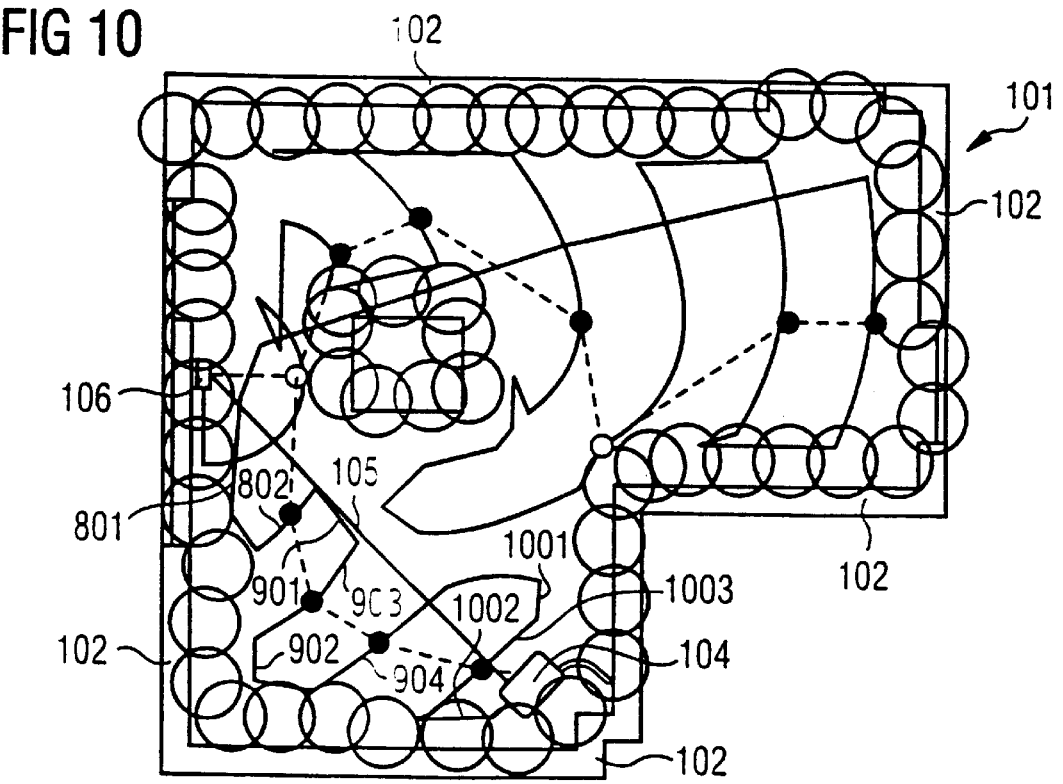

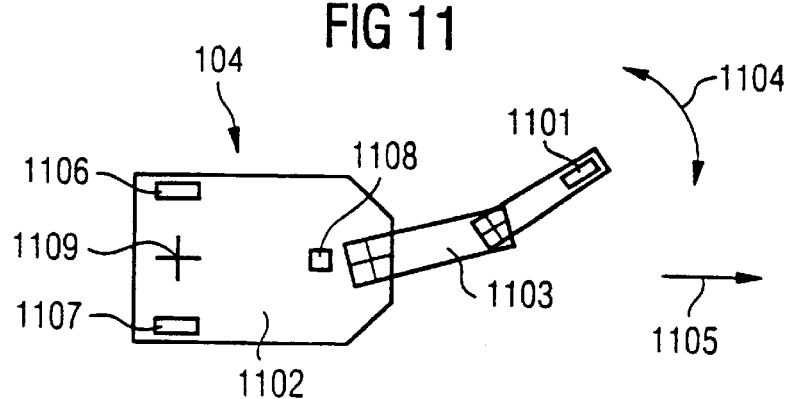
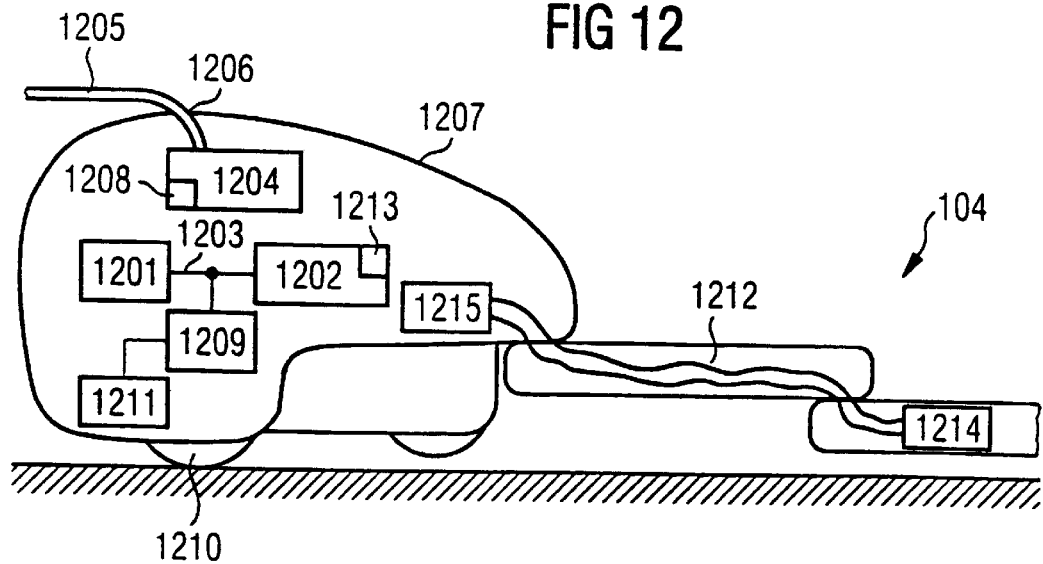

METHOD AND DEVICE FOR DETERMINING A PATH AROUND A DEFINED REFERENCE POSITION

The invention is directed to a method and to an arrangement for determining a path.

Such a method and such an arrangement are known from [1]. In this determination, markings are employed in order to define a path along which a robot moves.

The marking of a path is involved and, thus, expensive, and is also not desired in all areas. In particular, the demand is made of a robot that it find its way on its own such in a space in which it had not previously been and about which it also has no data stored in a memory in the form of a digital map that it can the entire space as gap-free as possible, whereby a multiple traversal of one area of the space should be kept as slight as possible.

The invention is thus based on the problem of determining a path around a predetermined reference position, as a result whereof a simplified, cost-beneficial navigation within a space is possible without prior knowledge, and no markings are required.

The problem is solved by the method as well as by the arrangement having the features according to the independent patent claims.

The following steps are iteratively implemented in the method:
An arcuate path around the reference position having a predetermined spacing is determined step-by-step;
the existence of an obstacle along the arcuate path is checked;
the arcuate path is lengthened as long as no obstacle is found;
when an obstacle is found, the spacing is enlarged by a prescribable value and the method is continued in a new iteration with the enlarged spacing.

The arrangement comprises a processor that is configured such that an iterative method having the following steps can be implemented:
An arcuate path around the reference position having a predetermined spacing is determined step-by-step;
the existence of an obstacle along the arcuate path is checked;
the arcuate path is lengthened as long as no obstacle is found;
when an obstacle is found, the spacing is enlarged by a prescribable value and the method is continued in a new iteration with the enlarged spacing.

The invention specifies a very simple and, thus, cost-beneficial navigation strategy for a mobile arrangement in a space. the invention can be advantageously utilized for steering an arrangement along the identified path. What is achieved in this way is that, given a space in which the arrangement had not previously been and about which the arrangement has no information, an arrangement can cover the entire space with a slight overlap area in a very simple and cost-beneficial way. What is to be understood as an overlap area is a part of the space in which the path that is multiply contained in the identified path is determined.

It is provided in a development of the invention that the arrangement is connected via a cable to an electrical terminal that represents the reference position. The distance is determined on the basis of the cable length. This development established an extremely cost-beneficial and, due to an element, the cable, already contained in the power supply given a plurality of arrangements, cost-beneficial [sic] orientation aid for the arrangement.

The invention can be advantageously utilized for the orientation of a robot or, too, of a vacuum cleaner.

An exemplary embodiment of the invention is shown in the drawings and is explained in greater detail below.

Shown are:

FIGS. 1–10 sketches of a space that represent the determination of the path by way of example;

FIG. 11 a symbolic sketch of a vacuum cleaner in plan view;

FIG. 12 a symbolic sketch of a vacuum cleaner with a processor, a memory and a steering mechanism.

FIG. 1 shows a room 101 with walls 102 and a table 103 as an obstacle.

A vacuum cleaner 104 is connected via a cable 105 to an electrical terminal 106, a receptacle. The vacuum cleaner 104 comprises a pivotable arm 107. The arm 107 also comprises a plurality of tactile sensors 108 with whose assistance an obstacle is recognized by touching the obstacle with the arm 107.

As shown in FIG. 12, the vacuum cleaner 104 comprises a processor 1201 as well as a memory 1202 that are connected to one another via a bus 1203. An identified and traversed path 109 is stored in an electronic map 1213 in the memory 1202. Every obstacle identified on the path is entered in the map 1213.

The vacuum cleaner 104 also comprises a cable drum 1204 for winding up acable 1205.

The cable 1205 is conducted out of the vacuum cleaner 104 through an opening 1206 in the housing 1207 of the vacuum cleaner 104. The cable drum 1204 comprises a motor 1208 with which the cable drum 1204 is driven for unwinding or, respectively, winding up the cable 1205. The vacuum cleaner 104 also comprises a steering mechanism 1209 connected to the bus 1203 with which the wheels 1210 of the vacuum cleaner 104 and a motor 1211 for driving the vacuum cleaner 104 are driven such that the vacuum cleaner 104 travels through a room on the above-described path.

The method described below for determining the path is implemented in the processor 1201. Further, the vacuum cleaner 104 comprises a movable arm 1212 with a suction nozzle 1214 and a dust bag 1215 for holding the dust.

The path 109, which is symbolically shown with a line in FIG. 1, is determined and traversed by the vacuum cleaner in the following way.

The path 109 begins at the electrical terminal 106. The vacuum cleaner 104, using the tactile sensors 108, recognizes the wall 102 as an obstacle and travels on a straight path along the wall in a prescribable direction 110, which is indicated by an arrow 110, until a predetermined length of the cable 105 has been reached. A distance is determined by the length of the cable 105.

The vacuum cleaner 104 now travels over an arcuate path around the electrical terminal with the interval of the cable length as radius until a tactile sensor 108 determines an obstacle.

The arm 107 is thereby laterally swivelled around the path 109, and the vacuum cleaner 104 vacuums the floor.

The vacuum cleaner 104 recognizes the wall 102 at the side of the electrical terminal 106. When the wall 102 is recognized as obstacle, which is symbolically represented as rings 111 in FIG. 1, then a check is carried out to see whether a path that was already previously traveled is selected given selection of the path 109 in the direction of the electrical terminal 106, i.e. when the interval and, thus, the cable length are shortened.

The check ensues with reference to the stored map. 1213 in which a path 109 already traveled by the vacuum cleaner 104 is stored.

In this exemplary embodiment, the vacuum cleaner 104 has detected the table 103 as obstacle on the way to the wall lying opposite the electrical terminal 106, this being symbolically shown with two rings 112, 113 in FIG. 1.

The traversed path 109 is stored in the map 1213 in such a way that a first sub-section of the path 109 in which an obstacle has been detected is provided with a first marking, this being symbolically shown in the Figures with rings. A second subsection of the path 109 wherein no obstacle has been detected—referred to below as open area—is provided with a second marking, which is symbolically shown in the Figures with a respective asterisk.

FIG. 2 shows the case that, as shown in FIG. 1, the path would lead into an area that has already been traversed given a path selection in the direction of the electrical terminal 106.

For this reason, the vacuum cleaner 104 travels along the wall, whereby the cable 1205 is played out from the cable drum 1204 of the vacuum cleaner 104, as a result whereof the cable length and, thus, the interval for a second arcuate path 202 is increased.

Until the cable length has arrived at the prescribable value for the interval of the second arcuate path 202, the vacuum cleaner 104 travels along the wall 102, this being shown but a first sub-path 201 in FIG. 2.

FIG. 3 shows the situation that the vacuum cleaner 104 again encounters the table 103, this being determined by the tactile sensors 108. This situation is symbolically represented by rings 301, 302, 303. The rings 301, 302, 303 represent symbolically stored, first markings within the stored map 1213. The markings are stored in the form of a progression [or: draft of traverse].

A check is again carried out to see whether the table 103 can be avoided by moving the vacuum cleaner 104 in the direction of the electrical terminal 106 without having to again travel over a path that has already been traversed. Since this is not possible in this case, the cable length and, thus, the interval are again increased.

While the cable 105 is being ejected from the cable drum 1204 of the vacuum cleaner 104, the vacuum cleaner 104 travels over a second sub-path 304 along the table 103.

After reaching the end point of the interval prescribed by the cable length, the vacuum cleaner 104 travels along another arcuate path 305 until the tactile sensors 108 again encounter the wall 102 of the room 101, this being symbolically represented by two further rings 306, 307.

FIG. 4 shows the situation that, by shortening the interval, an area of the room 101 that has not yet been traversed by the vacuum cleaner 104 is covered in the direction of the electrical terminal 106. This area is symbolically represented by two rings 401, 402 as well as by a third sub-path 403.

The vacuum cleaner 104 travels in the direction of the electrical terminal 106 until it encounters an area that was already previously covered by the vacuum cleaner 104, this being determined by comparison with the map 1213 stored in the memory 1202.

FIG. 5 shows a fourth sub-path 501 that the vacuum cleaner 104 travels along the wall 102 of the room 101 with what is again an increased cable length, as presented above.

Another arcuate path 502 is traversed by the vacuum cleaner 104 until it again encounters the table 103. This situation is symbolically represented by two further rings 503 and 504.

The vacuum cleaner 104 travels a fifth sub-path 505 along the table 103 in order to subsequently again [. . . ] a further arcuate path 506 around the table until it arrives at the already marked area of the table, an end point 507.

After traveling over a sixth sub-path 506 with lengthening of the cable, the vacuum cleaner 104 travels over another arcuate path 508 until it encounters a second wall 102. This situation is symbolized by three further rings 509, 510, 511. The vacuum cleaner continues to travel along the further arcuate path 508 until it encounters a third wall 102, symbolized by two rings 512 and 513.

Three open areas arise in this way, a first open area 514, a second open area 515 and a third open area 516 that are respectively identified with asterisks.

FIG. 6 shows the traversal of the third open area 516 on the part of the vacuum cleaner according to the above-described rules along further sub-paths 601, 602 and further arcuate paths 603, 604.

Consulting the map 1213, the vacuum cleaner 104 determines that it has covered the entire third open area 516 since the vacuum cleaner 104 can no longer travel over any area in the third open area 516 in which it has not already been.

The vacuum cleaner 104 now targets an area that is identified in the map 1213 as having not yet been traversed, i.e. the first open area 514 and the second open area 515. The vacuum cleaner 104, selected the first open area 514 and approaches it along an intermediate path 700.

The path 109 is stored in the map 1213 in the form of a tree structure, whereby an arcuate path is modelled in the form of a node 701, 702, 703, 704, 705, 706, 707 within the tree structure. An attribute is respectively allocated to the node K, a first attribute (symbolized by a filled-in circle 701, 702, 704, 705, 706) that indicates that the arcuate path does not adjoin an open area, or a second attribute (symbolized by an empty circle 703, 707) that indicates that the arcuate path adjoins an open area (see FIG. 7).

The vacuum cleaner travels toward the first open region 514 and travels over the first open area according to the above-described procedure along a further sub-path 801 (see FIG. 8) and a further arcuate path 802.

FIG. 9 shows the vacuum cleaner 104 after the complete first open area 514 and a part of the second open area 515 have been covered along further sub-paths 901 and 902 as well as further arcuate paths 903, 904.

FIG. 10 shows the vacuum cleaner 104 after the complete room 101 has been covered along further sub-paths 1001, 1002 as well as a further arcuate path 1003.

FIG. 11 shows the vacuum cleaner 104 in plan view. The vacuum cleaner cleans the floor of the room 101 in that it moves a nozzle 1101, which is contained in an arm 1103, essentially perpendicular to the main moving direction (symbolized by an arrow 1105) of the vacuum cleaner 104, i.e. basically executes a wiping motion, symbolized by an arcuate double arrow 1104. A housing 1102 that travels along the main moving direction comprises wheels 1106, 1107, 1108 that are at least partly driven by a motor (not shown).

The cable is conducted out of the housing 1102 through an opening 1109.

Some alternatives to the above-described exemplary embodiment are indicated below:

A qualitative location determination can ensue by measuring the length of the cable or, too, by employing further sensors for measuring the distance of the vacuum cleaner from the electrical terminal, generally a fixed reference point.

The further sensors can ensue [sic] according, for example, to the principle of an acoustic transit time measurement, whereby the sound is output by a transmitter of the vacuum cleaner. The result of the transit time measurement is sent back to the vacuum cleaner, for example with an optical signal, radio signal or directly via a signal transmitted over the cable.

As described above, the room as well as the covered area are stored in the map 1213 in the form of a tree structure. One strategy for approaching the areas that are still respectively open ensues upon analysis of the attributes that are allocated to the nodes of the tree, whereby a distance particular is also respectively allocated to the nodes that indicates how far the respective, further arcuate path is from the electrical terminal.

Possible strategies are:

"Depth first":

In this strategy, the nodes to which the first attribute is allocated are approached in that sequence that the node whose appertaining, arcuate path is at the greatest distance from the electrical terminal is respectively selected.

"Width first":

In this strategy, the nodes to which the first attribute is allocated are approached in the sequence that the node whose appertaining arcuate path lies closest to the electrical terminal is respectively selected.

"Best first":

In this strategy, the nodes to which the first attribute is allocated are approached in the sequence that the node that is optimum in view of a prescribable criterion is respectively selected.

The following publication has been cited in this document:

[1] J. Borenstein, Navigating mobile robots: systems and techniques, A. K. Peters Ltd., ISBN 1-56881-058-X, pages 141–151, 1996.

What is claimed is:

1. A method for computer-supported determination of a path in a proximity of a predetermined reference position, comprising the iteratively repeated steps of:

determining step-by-step an arcuate path in a proximity of said reference position having a predetermined spacing;

checking for an existence of an obstacle along said arcuate path;

lengthening said arcuate path if no obstacle is found;

enlarging said spacing, when an obstacle is found, by a prescribable value; and continuing said method in a new iteration with said enlarged spacing.

2. The method according to claim 1, further comprising the steps of:

storing an electronic map of said path; and entering every identified obstacle into said electronic map.

3. The method according to claim 2, wherein said map describes an identified path in the form of a progression.

4. The method according to claim 1, further comprising the steps of:

checking, in every iteration after detecting an obstacle, as to whether an already-contained path that is already contained in an identified path would be determined given a shortening of an interval;

determining an increased-interval path with an increased interval if said determined path is already contained; and determining a shortened-interval path with a shortened interval if said determination path is not already contained in a new iteration.

5. The method according to claim 1, wherein said obstacle is a wall of said determined path.

6. The method according to claim 1, further comprising the step of determining an obstacle path along said obstacle given a lengthening of an interval.

7. The method according to claim 1, wherein said reference position is an electrical terminal.

8. The method according to claim 7, further comprising the step of:

steering an arrangement along an identified path.

9. The method according to claim 8, wherein said arrangement is connected to said electrical terminal via a cable.

10. The method according to claim 9, wherein said cable length is designed to be variable and an interval is determined based on said cable length.

11. A robot that utilizes the method according to claim 8.

12. A vacuum cleaner that utilizes the method according to claim 8.

13. An arrangement for determining a path in a proximity of a predetermined reference position, comprising:

a processor that is configured to implement the following steps in an iterative manner:

determining step-by-step an arcuate path in a proximity of said reference position having a predetermined spacing;

checking for an existence of an obstacle along the arcuate path is checked;

lengthening said arcuate path if no obstacle is found;

enlarging said spacing, when an obstacle is found, by a prescribable value; and implementing a continuation of said steps in a new iteration with said enlarged spacing.

14. The arrangement according to claim 13 comprising at least one sensor for determining an obstacle.

15. The arrangement according to claim 13, comprising a memory in which an electronic map of a path can be stored, every identified obstacle being entered within said map.

16. The arrangement according to claim 15, wherein said processor is configured to implement said map describing an identified path in a form of a progression.

17. The arrangement according to claim 13 wherein said processor is configured to:

check, in every iteration after detecting an obstacle, as to whether an already contained path that is already contained in an identified path would be determined given a shortening of an interval;

determine an increased-interval path with an increased interval if said determined path is already contained; and determine a shortened-interval path with a shortened interval if said determination path is not already contained in a new iteration.

18. The arrangement according to claim 13, wherein said obstacle is a wall of said identified path.

19. The arrangement according to claim 13 wherein said processor is configured to determine a path along an obstacle given a lengthening of an interval.

20. The arrangement according to claim 13, wherein said reference position is an electrical terminal.

21. The arrangement according to claim 20, further comprising a steering mechanism with which said arrangement is steered along an identified path.

22. The arrangement according to claim 21, further comprising a cable by which said arrangement is connected to said electrical terminal.

23. The arrangement according to claim 22, wherein said cable length is designed variable and said interval can be determined based on said cable length.

24. The arrangement according to claim 21, wherein said arrangement is a robot.

25. The arrangement according claim 21, wherein said arrangement is a vacuum cleaner.

* * * * *